United States Patent [19]

Ohmura et al.

[11] 4,190,567

[45] Feb. 26, 1980

[54] AQUEOUS CATIONIC POLYURETHANE EMULSION WITH GLYCIDYL ETHER CURING AGENT

[75] Inventors: Hidemasa Ohmura; Masahiro Saito, both of Wakayama, Japan

[73] Assignee: Kao Soap Co., Ltd., Tokyo, Japan

[21] Appl. No.: 857,026

[22] Filed: Dec. 2, 1977

[30] Foreign Application Priority Data

Dec. 13, 1976 [JP] Japan ................................. 51/149543

[51] Int. Cl.[2] ...................... C08L 63/00; C08L 75/02; C08L 75/12
[52] U.S. Cl. ...................... 260/29.2 TN; 260/29.2 EP; 525/423; 525/426; 525/452; 525/454; 525/455; 525/459
[58] Field of Search ................................. 260/29.2 TN

[56] References Cited

U.S. PATENT DOCUMENTS

| | | | |
|---|---|---|---|
| 3,756,992 | 9/1973 | Dieterich | 260/29.2 TN |
| 3,836,493 | 9/1974 | Matsuda et al. | 260/29.2 TN |
| 3,903,031 | 9/1975 | Matsuda et al. | 260/29.2 TN |
| 4,016,120 | 4/1977 | Matsuda et al. | 260/29.2 TN |
| 4,016,121 | 4/1977 | Matsuda et al. | 260/29.2 TN |
| 4,046,729 | 9/1977 | Scriven et al. | 260/29.2 TN |
| 4,094,842 | 6/1978 | Wenzel et al. | 260/29.2 TN |

*Primary Examiner*—Murray Tillman
*Assistant Examiner*—Arthur H. Koekert
*Attorney, Agent, or Firm*—Blanchard, Flynn, Thiel, Boutell & Tanis

[57] ABSTRACT

A curable film-forming cationic polyurethane emulsion containing a compound having an epoxide group, as a curing agent.

15 Claims, No Drawings

AQUEOUS CATIONIC POLYURETHANE EMULSION WITH GLYCIDYL ETHER CURING AGENT

BACKGROUND OF THE INVENTION

1. FIELD OF THE INVENTION

The present invention relates to a polyurethane emulsion composition. More particularly, the present invention relates to a homogeneous stable self-emulsifiable cationic polyurethane emulsion composition.

2. DESCRIPTION OF THE PRIOR ART

Various processes have heretofore been developed and proposed for the preparation of polyurethane emulsions. For example, an emulsifier-free, i.e., a so-called self-emulsifiable, polyurethane emulsion is prepared by forming a urethane prepolymer having terminal isocyanate groups from a polyhydroxyl compound and an organic polyisocyanate, wherein said polyisocyanate is used in an amount in excess of the stoichiometric equivalent amount, chain-extending said urethane prepolymer with a chain extender having a tertiary amino group to form a polyurethane composition containing a tertiary amino group, quaternizing said tertiary amino group and mixing the polyurethane composition with water or an aqueous solution of an acid. According to another process, a polyurethane composition is dispersed in water in the presence of an emulsifier to form a polyurethane emulsion.

In general, polyurethane resins have excellent physical and chemical properties. However, since introduction of chemical cross-linkages is difficult or the emulsifier often remains in the polyurethane resin, the physical and chemical properties of a polyurethane resin film prepared from a polyurethane emulsion prepared by the above process are extremely inferior to those of a film made of a cross-linked polyurethane resin, and therefore, the fields of use of such polyurethane emulsions are greatly restricted.

Polymers having strong cross-linkages are infusible and insoluble, so that the handling of same in the preparation process is generally difficult, and is impossible in many cases. Accordingly, it is substantially impossible to form emulsions by dispersing these polymers into water. In the case of polyurethanes, even if they can be dispersed in water, the resulting emulsions are very unstable in many cases.

SUMMARY OF THE INVENTION

We have discovered that a cationic self-emulsifiable aqueous emulsion of a polyurethane resin having excellent physical properties can be obtained by combining a cationic self-emulsifiable polyurethane emulsion prepared according to the process described below with an epoxide group-containing compound. More specifically, we have discovered that (1) diglycidyl ethers of diols represented by ethylene glycol, propylene glycol, polyoxyethylene glycol, polyoxypropylene glycol, neopentyl, glycol and bisphenol A, (2) polyglycidyl ethers of polyfunctional alcohols represented by glycerin, trimethylol propane, pentaerythritol, diglycerol, and sorbitol; allyl glycidyl ether, and oligomers thereof, have an excellent curing action to cationic self-emulsifiable polyurethane emulsions prepared according to the process of the present invention. Based on this finding, we have now completed the present invention.

The cationic self-emulsifiable polyurethane emulsion constituting a component of the composition of the present invention is prepared by a process comprising, reacting a free (unblocked) isocyanate-terminated urethane prepolymer (A) formed by reaction of a polyhydroxyl compound with an excess amount of a polyisocyanate, with an excess amount of a polyalkylene polyamine, preferably in a ketone type solvent, to form a polyurethane urea polyamine (B). The product (B) is mixed with an aqueous solution of an acid or the product (B) is reacted with an epihalohydrin to form a product (C). The resulting reaction product (C) is mixed with an aqueous solution of an acid. Moreover, there can be effectively adopted a process comprising reacting said urethane prepolymer (A) with a polyalkylene polyamine derivative having at least 2 primary or secondary amino groups and at least one functional group having the formula $-CH_2-CH(OH)-CH_2X$ (in which X is Cl or Br) and mixing the reaction product with an aqueous solution of an acid. Another effective process comprises partially reacting the free amino groups of said polyurethane urea polyamine (B) with a blocked polyisocyanate compound having one free isocyanate group, which is obtained from a polyisocyanate and an isocyanate-blocking agent, and mixing the resulting reaction product with an aqueous solution of an acid.

As the polyisocyanate used to make the urethane prepolymer (A), there can be mentioned, for example, aromatic and aliphatic polyisocyanates such as 1,5-naphthylene diisocyanate, 4,4'-diphenylmethane diisocyanate, 4,4'-diphenyldimethylmethane diisocyanate, di- and tetraalkyldiphenylmethane diisocyanates, 4,4'-dibenzyl diisocyanate, 1,3-phenylene diisocyanate, toluene diisocyanate, chlorinated isocyanates, brominated isocyanates, phosphorus-containing isocyanates, butane-1,4-diisocyanate, hexane-1,6-diisocyanate, dicyclohexylmethane diisocyanate, cyclohexane-1,4-diisocyanate, xylene diisocyanate and lysine diisocyanate. Further, mixtures of these diisocyanates with triisocyanates such as 1-methylbenzole-2,4,6-triisocyanate, biphenyl-2,4,4'-triisocyanate and triphenylmethane triisocyanate can be used.

The polyhydroxyl compound used to make the urethane prepolymer (A) has a molecular weight of 200 to 10,000. Any of the known polyhydroxyl compounds customarily used for preparing polyurethanes, for example, polyethers, polyesters, polyester amides, polyacetals, polythioethers and polybutadiene glycols, can be used in the present invention. In addition, bisphenol A and glycols formed by adding alkylene oxides such as ethylene oxide and propylene oxide to bisphenol A can be used as the polyhydroxyl compound.

As the polyether, there can be mentioned, for example, homopolymers, copolymers and graft copolymers of tetrahydrofuran, ethylene oxide, propylene oxides and butylene oxide. In addition, there can be used homogeneous polyethers formed by condensation of hexane diol, methylhexane diol, heptane diol and octane diol and mixed polyethers, and propoxylated and ethoxylated glycols. Polycondensates of thioglycol alone or with other glycols are preferably employed as the polythioether. As the polyacetal, there can be mentioned, for example, water-insoluble polyacetals derived from hexane diol and formaldehyde and from 4,4'-dioxyethoxydiphenyldimethylmethane and formaldehyde. As the polyester, there can be used, for example, polyester glycols obtained by dehydrating condensation of saturated or unsaturated low-molecular weight glycols such as ethylene glycol, propylene glycol, 1-3-butane diol, 1,4-butane diol, neopentyl glycol, pentane diol, hexane diol, octane diol, 2-ethyl-1,3-hexane diol, 1,4-butyne diol, bisphenol A, diethylene glycol, triethylene glycol and dipropylene glycol, with dibasic acids, and polyester glycols formed by ring-opening polymerization of cyclic ester compounds. Glycols customarily used in this field, such as ethylene glycol, diethylene glycol, triethylene glycol, butane diol, propane diol, 1,6-hexane diol, neopentyl glycol, N-alkyl diethanol amines having an alkyl group containing 11 to 22 carbon atoms and adducts of ethylene oxide and propylene oxide to bisphenol A can be used in combination with the above-mentioned polyhydroxyl compounds.

Preparation of the urethane prepolymer (A) is conducted in the absence or in the presence of a solvent. A reaction temperature of 50° to 100° C. is employed when an aromatic polyisocyanate is used, and a reaction temperature of 70° to 130° C. is employed when an aliphatic or alicyclic polyisocyanate is used. It is preferred that the amount of the polyisocyanate is such that all the hydroxyl groups are reacted. Accordingly, it is preferred that the ratio of the total number of isocyanate groups to the total number of reactive hydrogen atoms be in the range of from 1.1/1.0 to 5.0/1.0.

Various polyalkylene polyamines including polyethylene polyamine, polypropylene polyamine and polybutylene polyamine can be used in the present invention. More specifically, there are employed polyamines in which the nitrogen atoms are connected by groups having the formula $-C_nH_{2n}-$ in which n is an integer of at least 1 and the number of such groups in the molecule is from 2 to about 4. Two nitrogen atoms can be bonded to adjacent atoms of the group $-C_nH_{2n}-$ but they cannot be bonded to the same carbon atom. Namely, not only diethylene triamine, triethylene tetramine, tetraethylene pentamine and dipropylene triamine, but also mixtures thereof and various crude polyamine materials can be used. Moreover, hydroxyalkyl-substituted polyamines can be used in combination.

In some cases in order to change the density of the hydrophilic groups or to increase the number of hydrogen atoms of the substituted urea linkage in the polyurethane emulsion prepared according to the present invention, it is desirable to increase the spacing between two adjacent amino groups in the molecule of the polyurethane urea polyamine. This can be accomplished by replacing a part of the polyalkylene polyamine by hydrazine, ethylene diamine, propylene diamine, hexamethylene diamine, piperazine, phenylene diamine, these amines substituted with a saturated alkyl group having 1 to 22 carbon atoms, and alkylene oxide adducts, acrylonitrile adducts and acrylic acid ester adducts of these diamines. In general, the degree of substitution is up to 50% and the intended purposes of this invention can be attained sufficiently by such degree of substitution.

It is preferred that the reaction between the isocyanate-terminated urethane prepolymer (A) and the polyalkylene polyamine be carried out under atmospheric pressure, in a ketone type solvent, at a temperature of $-20°$ to 70° C. As the ketone type solvent, there can be mentioned acetone, methylethyl ketone, diethyl ketone, dipropyl ketone, methylisobutyl ketone and methylisopropyl ketone. Acetone and methylethyl ketone are preferred. Further, mixtures of these ketone-type solvents with benzene, tetrahydrofuran, dioxane, acetic acid esters, dimethyl formamide and chlorinated hydrocarbon solvents can be used. The reaction time is determined depending on the reaction temperature and the reactivity of the polyisocyanate compound. Under some reaction conditions, a shorter or longer reaction time can be adopted. The end point of the reaction is the point at which an absorption of the isocyanate group at 2250 cm$^{-1}$ is not observed in the infrared absorption spectrum of the reaction mixture. In general, the reaction time is 0.5 to 2 hours.

In the reaction between the isocyanate-terminated urethane prepolymer (A) and the polyalkylene polyamine, it is critical that the total number of the primary and secondary amino groups should be in excess in relation to the number of the isocyanate groups. As the total mole number of the amino groups becomes closer to the total mole number of the isocyanate groups, a polyurethane urea polyamine having a higher molecular weight is formed, but a gelled product or a product which is readily gelled is formed. When the molar ratio of the amino groups is excessively increased, a polyurethane urea polyamine having a low molecular weight is formed. If such product is used as an intermediate for preparing a polyurethane emulsion, a resin possessing excellent properties when cured by an epoxide group-containing compound cannot be obtained. Accordingly, it is preferred that the ratio of the total number (b) of the primary and secondary amino groups of the polyalkylene polyamine to the number (a) of the isocyanate groups of the urethane prepolymer is in the range of $1 < (b)/(a) \leq 3$ and the molecular weight of the polyurethane urea polyamine (B) is 5,000 to 100,000.

The preparation of a cationic self-emulsifiable polyurethane emulsion from the thus-prepared polyurethane urea polyamine (B), as the intermediate, is accomplished by either (I) mixing the polyurethane urea polyamine (B) with an aqueous solution of an acid or (II) by reacting the polyurethane urea polyamine (B) with an epihalohydrin wherein the amount of said epihalohydrin is from 0.1 to 1.0 mole per mole of the free amino groups of the polyurethane urea polyamine (B) and mixing the resulting reaction product with an aqueous solution fo an acid. As the epihalohydrin, epichlorohydrin and epibromohydrin are preferred. The reaction conditions are changed depending on the kind of the polyurethane urea polyamine (B) used, but in general, the reaction is carried out at a temperature of 20° to 70° C. for 0.5 to 5 hours.

Aqueous solutions of inorganic acids and organic acids can be used as the aqueous solution of the acid for preparing the emulsion. Aqueous solutions of monobasic acids such as hydrochloric acid, nitric acid, acetic acid, propionic acid, monochloroacetic acid and glycolic acid are preferably employed. It is preferred that the amount of the acid used is such that the pH of the resulting polyurethane emulsion is in the range of about 5 to about 7.

The organic solvent used for the reaction can be removed from the thus-prepared cationic self-emulsifiable polyurethane emulsion by distillation, preferably under reduced pressure. Even if the organic solvent is removed by distillation, the stability of the emulsion is not reduced.

A polyalkylene polyamine derivative having at least 2 primary or secondary amino groups and at least one functional group having the formula $-CH_2-CH(OH)-CH_2X$ (in which X is Cl or Br) can be used instead of the polyalkylene polyamine. As examples of such polyalkylene polyamine there can be mentioned compounds having the following formula (I):

$$R-A-CH_2-CH(OH)-CH_2X \quad (I)$$

wherein X is Cl or Br, A is a secondary or tertiary amino group, and R is an alkylene group having at least one primary or secondary amino group, with the proviso that at least two primary or secondary amino groups are contained in the compound of the formula (I).

The compound of the formula (I) can be obtained by reacting the above-mentioned polyalkylene polyamine with an epihalohydrin such as epichlorohydrin or epibromohydrin. The ratio of the amounts of the polyalkylene polyamine and the epihalohydrin is changed depending on the number of amino groups contained in one molecule of the polyalkylene polyamine. This ratio should be chosen so that at least two primary or secondary amino groups are contained in one molecule of the compound represented by the formula (I). It is generally preferred that the reaction be carried out at 10° to 80° C. for 0.5 to 5 hours.

In the step of preparing a cationic self-emulsifiable polyurethane emulsion by mixing the above-mentioned polyurethane urea polyamine (B) with an aqueous solution of an acid, it is possible to partially react the free amino groups of the polyurethane urea polyamine (B) with a blocked polyisocyanate compound having one free isocyanate group, which is obtained from a polyisocyanate and an isocyanate-blocking agent. The above-mentioned isocyanate-terminated urethane prepolymer and the above-mentioned polyisocyanates used for production of the urethane prepolymer (A) are preferably employed as the polyisocyanate used for preparing the blocked polyisocyanate compounds. As the isocyanate-blocking agent, there are employed, for example, acidic sodium sulfite, secondary amines, tertiary alcohols, amides, phenol, phenol derivatives, lactams (such as ε-caprolactam), oximes (such as methylethyl ketone oxime), cyanic acid, ethylene imine, glycidol, hydroxyamines, imines, mercaptans, pyrrolidones and malonic acid esters. In the reaction between the polyisocyanate and the isocyanate blocking agent, it is necessary that the isocyanate-blocking agent should be reacted so that one of the isocyanate groups of the polyisocyanate is left free. The thus-prepared blocked polyisocyanate having one free isocyanate group is reacted partially with free amino groups of the polyurethane urea polyamine (B) so that the resulting final polymer is dispersible in water. This reaction is carried out at −20° to 70° C. for 0.5 to 2 hours.

By mixing the thus-prepared cationic self-emulsifiable polyurethane emulsion with an epoxide group-containing compound, the polyurethane resin is cured to improve the physical properties of the resin. The most prominent feature of the present invention resides in this point. As typical examples of the epoxide group-containing compound, there can be mentioned ethylene glycol diglycidyl ether, propylene glycol diglycidyl ether, polyoxyethylene glycol diglycidyl ether, polyoxypropylene glycol diglycidyl ether, neopentyl glycol diglycidyl ether, bisphenol A diglycidyl ether, glycerin polyglycidyl ether, trimethylol propane polyglycidyl ether, pentaerythritol polyglycidyl ether, diglycerol polyglycidyl ether, sorbitol polyglycidyl ether, allyl glycidyl ether and oligomers thereof. These compounds are prepared from corresponding alcohols and epichlorohydrin according to known methods. Water-soluble compounds are especially preferred among the above-exemplified compounds. The self-emulsifiable polyurethane emulsion that is used for the preparation of the composition of the present invention has properties as a polymeric surface active agent and it has a capability of dispersing or emulsifying hydrophobic substances in water. Accordingly, even oil-soluble epoxide group-containing compounds can be used conveniently.

When the epoxide group-containing compound is incorporated in the cationic self-emulsifiable polyurethane emulsion prepared according to the above-mentioned process, it is preferred that the epoxide group-containing compound is used in an amount of 2 to 50 parts by weight per 100 parts by weight of the resin present in the emulsion. When the amount of the epoxide group-containing compound is smaller than 2 parts by weight per 100 parts by weight of the resin, curing is insufficient, and if the amount of the epoxide group-containing compound is larger than 50 parts by weight per 100 parts by weight of the resin, the inherent characteristics of the polyurethane resin, such as softness, elasticity, flexibility at low temperature and abrasion resistance, are lost in the resulting cured resin.

When the cationic self-emulsifiable polyurethane emulsion and the epoxide group-containing compound are mixed at the above-mentioned mixing ratio, the pot life of the resulting emulsion composition is changed so as to be in the range of from several minutes to scores of days depending on the specific polyurethane emulsion and epoxide group-containing compound used. Accordingly, curing can be effected at room temperature, and if the composition is heat-set at a temperature of 50° to 180° C., the physical properties of the resin can be remarkably improved. Moreover, curing agents customarily used for epoxy compounds, such as amine type compounds, acid anhydride type compounds, organic acids and alcohols and catalysts such as zinc borofluoride, sodium hydroxide, quaternary ammonium salts and alcoholates can be used for curing of the composition of the present invention, but in general, these curing agents or catalysts need not be used.

The specific property that the cationic self-emulsifiable polyurethane emulsion prepared according to the above-mentioned process can easily be set and cured by the above-mentioned epoxide group-containing compound is not possessed by conventional polyurethane resins. The most prominent characteristic feature of the present invention resides in this point.

The cationic self-emulsifiable polyurethane emulsion of the present invention does not contain a so-called emulsifier. However, in order to further improve the stability of the emulsion or to incorporate the water-insoluble epoxy compound more homogeneously in the emulsion, it is possible to use a known emulsifier.

One of the objects of the present invention is to impart reactivity to a polyurethane resin in a polyurethane emulsion. In order to impart reactivity to a polyurethane resin, it may be considered preferable to incorporate an epoxide group-containing compound into a polyurethane resin or prepolymer not in the emulsified state, thereby to cure the polyurethane resin and to improve the physical properties of the resin. However, such resin generally has a very high viscosity and is solid in some cases. Therefore, it is very difficult to incorporate an epoxide group-containing compound therein and even if such incorporation is possible, very difficult problems are encountered during storage and transportation. More specifically, in summer the temperature of the contents of a package is elevated to 40° to 50° C. during storage or transportation, and in such state the polyurethane resin or prepolymer containing the epoxide group-containing compound is readily gelled and such troubles as extreme rise of the viscosity are inevitably caused.

The occurrence of such troubles is completely prevented in the polyurethane emulsion composition of the present invention. When the polyurethane emulsion composition is exposed to a temperature of 50° to 60° C., the viscosity is hardly changed from before to after the exposure and an adequate flowability is maintained. Accordingly, no troubles occur during the packaging, transporting, storing and dispensing operations and a very excellent storage stability can be attained. This effect as well as other effects proves that the present invention is very excellent.

The cationic polyurethane emulsion composition of the present invention can be impregnated in or coated on fibrous materials, non-woven fabrics, papers, leathers, rubbers, wooden materials, metals, concretes, gypsum materials, glass articles, glass fibers and plastics, whereby excellent coatings can be obtained and the adhesion and touch can be remarkably improved. Moreover, the cationic polyurethane emulsion composition of the present invention can be used in various fields in which rubber latices and resin emulsions are customarily used, for example, for the civil engineering construction and for the manufacture of inks. Especially, the cationic emulsion composition of the present invention can be effectively used for the production of a setting aqueous paint or as a fiberprocessing agent.

The present invention will now be described in more detail by reference to the following illustrative Preparations and Examples, that by no means limit the scope of the invention. In these Preparations and Examples, all references to "parts" and "%" are by weight, unless otherwise indicated.

Preparation 1 Preparation of Glycerin Polyglycidyl Ether:

A round-bottom flask equipped with an agitator, a thermometer and a cooler was charged with 276 parts of glycerin and 828 parts of epichlorohydrin, and then 10 parts of an ether solution of a boron trifluoride-ether adduct containing 0.5 part of a boron trifluoride (BF$_3$) was added under agitation. Reaction was carried out at 50° to 75° C. for 3 hours while preventing elevation of the temperature by ice cooling. Then 370 parts of the resulting viscous liquid condensate was dissolved in 900 parts of dioxane, and 300 parts of sodium aluminate (NaAlO$_2$) was added and the mixture was heated and refluxed under agitation for 9 hours.

Then, the reaction mixture was cooled to room temperature, and solids were separated by filtration under reduced pressure. The solvent and the remaining volatile substances were removed from the filtrate by distillation at 205° C. under a pressure of about 20 mm Hg to obtain glycerin polyglycidyl ether containing 11.5% of oxirane oxygen.

Preparation 2

According to a known process similar to the process described in Preparation 1, from ethylene glycol, polyoxyethylene glycol (having a molecular weight of 400), trimethylol propane, diglycerol, sorbitol, propylene glycol and epichlorohydrin, there were prepared the corresponding polyglycidyl ethers.

EXAMPLE 1

(A) A propylene oxide adduct of bisphenol A (having a hydroxyl value of 315) was dried and dehydrated in a nitrogen gas at 90° C. for 2 hours under a pressure of about 20 mm Hg. Then, 115 parts of the dehydrated adduct was charged in a round-bottom flask equipped with an agitator and a thermometer, and 97.5 parts of methylethyl ketone was added thereto to form a homogeneous mixture. Then, 112.5 parts of an 80/20 mixture of 2,4-tolylene diisocyanate/2,6-tolylene diisocyanate was added and reaction was carried out at 70° C. for 4.5 hours to obtain a transparent homogeneous urethane prepolymer solution. The free isocyanate content in this solution was 8.34%.

Separately, a solution of 39.1 parts of diethylene triamine in 487.4 parts of methylethyl ketone was charged in another round-bottom flask, and the above urethane prepolymer solution was added dropwise to this solution at 30° to 40° C. over a period of 40 minutes and 162.5 parts of methylethyl ketone was further added to the mixture. Reaction was carried out at 50° C. for 30 minutes under agitation to obtain a polyurethane urea polyamine solution.

Then, 42.8 parts of a 70% aqueous solution of glycolic acid and 707 parts of deionized water were added to the above solution and homogeneously mixed therewith. The solvent, methylethyl ketone, was removed by distillation under reduced pressure at 40° to 50° C. and water was added to adjust the concentration. Thus, a homogeneous semitransparent solution-like aqueous polyurethane emulsion having a resin content of 30% was obtained.

(B) Fiber-Processing Test:

Twenty parts of the polyurethane emulsion obtained in (A) above was mixed with 1.5 parts of the glycerin polyglycidyl ether obtained in Preparation 1, and the mixture was diluted with water to form 1000 ml of a treating bath. A knitted fabric of polyester fibers was dipped in this treating bath, squeezed by a mangle, dipped in the treating bath again, squeezed again by the mangle, dried at 100° C. for 5 minutes by hot air and heat-set at 150° C. for 3 minutes to obtain a sample to be tested (sample A).

Another sample to be tested (sample B) was prepared in the same manner as described above except that the glycerin polyglycidyl ether was not used.

The elasticity (compression modulus of elasticity), the nerve and the hard finish effect (bending resistance) of each of the samples and untreated fabric were measured according to the methods described below. The results shown in Table 1 were obtained.

Compression modulus of elasticity: JIS L-1018

Bending strength (g): JIS L-1004, method E (the value obtained in the lateral direction plus the value obtained in the longitudinal direction).

Table 1

|  | Compression Modulus of Elasticity | Bending Resistance |
| --- | --- | --- |
| Sample A | 46.3% | 97.0 g |
| Sample B | 37.7% | 55.5 g |
| Untreated Fabric | 36.4% | 49.0 g |

From the above results, it will readily be understood that good elasticity and good nerve (hardness) can be imparted to a knitted fabric of polyester fibers by using the polyurethane emulsion and glycerin polyglycidyl ether, in combination, according to the present invention.

EXAMPLE 2

When the infrared absorption spectrum was measured by utilizing one drop from the 1014 parts of a polyurethane urea polyamine solution prepared in Example 1, an absorption based on the free isocyanate group was not observed at 2250 cm$^{-1}$. To this polyurethane urea polyamine solution was added 101.4 parts of water, and 18.3 parts of epichlorohydrin was further added to the mixture. Reaction was carried out at 50° C. for 1 hour. Then, 707 parts of water and 42.8 parts of a 70% aqueous solution of glycolic acid were added to the reaction mixture, and in the same manner as described in Example 1, methylethyl ketone was removed by distillation and the concentration was adjusted to obtain a polyurethane emulsion having a resin content of 30%.

Then, 20 parts of the thus-obtained polyurethane emulsion was mixed with glycerin polyglycidyl ether in an amount indicated in Table 2, and the resulting composition was diluted with water. In the same manner as described in Example 1, a knitted fabric of polyester fibers was treated in 1000 ml of the thus-prepared treating bath to obtain a processed fabric having properties shown in Table 2.

Table 2

| Amount (g) of Glycerin Polyglycidyl Ether | Compression Modulus (%) of Elasticity | Bending Resistance (g) |
|---|---|---|
| 0 | 38.3 | 74.0 |
| 0.12 | 47.1 | 83.5 |
| 0.6 | 49.6 | 108.5 |
| 1.2 | 50.2 | 120.0 |
| 1.5 | 52.8 | 128.5 |
| 2.1 | 54.5 | 141.0 |
| 3.0 | 50.1 | 118.0 |
| Untreated Fabric | 36.4 | 49.0 |

EXAMPLE 3

In 20 parts of the polyurethane emulsion obtained in Example 2 there was incorporated 1.5 parts of a compound as indicated in Table 3, and the resulting composition was diluted with water to form 1000 ml of a treating bath. In the same manner as described in Example 1, a knitted fabric of polyester fibers was treated. The results obtained are shown in Table 3.

Table 3

| Compound | Compression Modulus (%) of Elasticity | Bending Resistance (g) |
|---|---|---|
| trimethylolpropane polyglycidyl ether | 53.4 | 142.0 |
| diglycerol polyglycidyl ether | 52.0 | 134.0 |
| sorbitol polyglycidyl ether | 51.6 | 138.0 |
| ethylene glycol diglycidyl ether | 49.8 | 132.5 |
| propylene glycol diglycidyl ether | 48.9 | 107.0 |
| polyoxyethylene glycol diglycidyl ether | 52.3 | 131.5 |
| polyurethane emulsion alone | 38.3 | 74.0 |
| untreated fabric | 36.4 | 49.0 |

EXAMPLE 4

A round-bottom flask equipped with a thermometer and an agitator was charged with 73.8 parts of a polyester glycol (having a hydroxyl value of 100.4), which had been prepared from ethylene glycol and adipic acid and dehydrated and dried, and 29.7 parts of 1,4-butane diol, 118.5 parts of methylethyl ketone and 74.2 parts of an 80/20 mixture of 2,4-tolylene diisocyanate and 2,6-tolylene diisocyanate were added thereto. Reaction was carried out at 80° C. for 11 hours to obtain a urethane prepolymer solution having a free isocyanate content of 0.84%.

Another flask was charged with 3.2 parts of diethylene triamine and 520 parts of methylethyl ketone, and they are homogeneously mixed. Then, 260 parts of the above urethane prepolymer solution was added dropwise from a dropping funnel to this homogeneous mixture over a period of 30 minutes and reaction was carried out at 50° C. for 30 minutes to obtain a polyurethane urea polyamine solution.

Then, 78 parts of water and 3.7 parts of epichlorohydrin were added to the above solution, and reaction was carried out at 50° C. for 1 hour. Then, 4.3 parts of a 70% aqueous solution of glycolic acid and 370 parts of water were added to the reaction mixture, and methylethyl ketone was removed by distillation under reduced pressure at 40° to 45° C. Water was added to the residue to adjust the concentration, whereby a homogeneous stable milky white polyurethane emulsion having a resin content of 30% was obtained.

The thus-obtained emulsion was cast on a Teflon sheet having a smooth surface and air-dried to obtain a smooth film having a thickness of about 1 mm (air-dired film I). The film was heat-treated in a uniform-temperature chamber maintained at 120° C. for 20 minutes to obtain a heat-treated film I.

Separately, 100 parts of the above emulsion was mixed with 3.3 parts of glycerin polyglycidyl ether, and by using the resulting composition, air-dried film II and heat-treated film II were prepared in the same manner as described above. These films were dipped in water maintained at 35° C. for 24 hours, and as a result, it was found that the swelling index (weight change ratio) and the change of the appearance were as shown in Table 4.

Table 4

| | Swelling Index | Appearance |
|---|---|---|
| air-dried film I | 72.5% | whitened |
| heat-treated film I | 30.2% | " |
| air-dried film II | 5.7% | not changed |
| heat-treated film II | 3.8% | " |

As will be apparent from the results shown in Table 4, both the air-dried film II and heat-treated film II (according to the present invention) have an excellent water resistance, and glycerin polyglycidyl ether has a property of improving remarkably the physical properties of the above polyurethane even at room temperature without use of an additional curing agent.

EXAMPLE 5

A round-bottom flask equipped with a thermometer and an agitator was charged with 91.9 parts of a propylene oxide adduct of bisphenol A (hydroxyl value=311.1), 64.3 parts of benzene and 58.1 parts of 1,6-hexamethylene diisocyanate, and reaction was carried out at 80° C. for 4 hours to obtain a urethane prepolymer solution having a free isocyanate group content of 3.32%. Since the solution had a concentration of 70% and the viscosity was high, the solution was diluted with benzene to form a urethane prepolymer solution having a concentration of 60%.

Another flask was charged with 8.73 parts of diethylene triamine and 225 parts of methylethyl ketone, and 198.3 parts of the above urethane prepolymer solution having a concentration of 60% was gradually added dropwise over a period of 1 hour and reaction was carried out at 50° C. for 30 minutes to obtain a polyurethane urea polyamine solution.

Then, 9.74 parts of epichlorhydrin was added to the above solution and reaction was carried out at 50° C. for 1 hour. Then, 11.4 parts of a 70% aqueous solution of glycolic acid and 551 parts of water were added to the reaction mixture, and benzene and methylethyl ketone were removed by distillation at 40° to 50° C. under reduced pressure and water was added to adjust the concentration. Thus, a homogeneous stable emulsion having a resin content of 20% was obtained.

A film prepared from this emulsion in the same manner as described in Example 4 was not uniform and cracks were formed in the resulting film. Accordingly, this film could not be subjected to the tensile test according to the method of JIS K-6301.

Separately, 100 parts of the above emulsion was mixed with 5 parts of glycerin polyglycidyl ether, and air-dried film and heat-treated film were prepared from the resulting composition in the same manner as described in Example 4. The mechanical properties of these films were tested according to the method of JIS K-6301. The results shown in Table 5 were obtained.

Table 5

|  | 100% Modulus | Tensile Strength | Elongation |
| --- | --- | --- | --- |
| air-dried film | 147 Kg/cm² | 196 Kg/cm² | 200% |
| heat-treated film | 174 Kg/cm² | 260 Kg/cm² | 160% |

EXAMPLE 6

A round-bottom flask was charged with 58 parts of polyoxytetramethylene glycol (hydroxyl value=113.4) which had been dried under reduced pressure and heating, 42 parts of 1,4-butane diol and 90 parts of methylethyl ketone, and they were homogeneously mixed. Then, 110 parts of an 80/20 mixture of 2,4-tolylene diisocyanate/2,6-tolylene diisocyante was added to the above mixture and reaction was carried out at 70° C. for 3.5 hours to obtain a urethane prepolymer solution having a free isocyanate group content of 3.1%.

Another flask was charged with 600 parts of methylethyl ketone and 13 parts of diethylene triamine, and they were homogeneously mixed. Then, 300 parts of the above urethane prepolymer solution was gradually added dropwise to this homogeneous mixture over a period of 1 hour at 10° to 20° C. Reaction was carried out at 50° C. for 30 minutes to form a polyurethane urea polyamine solution. Then, 90 parts of water and 15 parts of epichlorohydrin were added to 913 parts of the thus-prepared solution and reaction was carried out at 50° C. for 1 hour. Then, 13 parts of a 70% aqueous solution of glycolic acid and 340 parts of water were added to the reaction mixture and methylethyl ketone was removed by distillation under reduced pressure at 40° to 50° C. Then, water was added to adjust the concentration. Thus, a homogeneous stable emulsion having a resin content of 40% was obtained.

Air-dried film I and heat-treated film I were prepared from this emulsion in the same manner as described in Example 4. Further, 4.4 parts of ethylene glycol diglycidyl ether was incorporated into 100 parts of the above emulsion, and air-dried film II and heat-treated film II were prepared from the resulting composition in the same manner as described in Example 4. These films were tested with respect to the water resistance in the same manner as described in Example 4. The results shown in Table 6 were obtained.

Table 6

|  | Swelling Index | Appearance |
| --- | --- | --- |
| air-dried film I | — | jelly-like |
| heat-treated film I | 75.6% | whitened |
| air-dried film II | 20.2% | not changed |
| heat-treated film II | 7.0% | " |

EXAMPLE 7

A round-bottom flask equipped with a thermometer and an agitator was charged with 510 parts of dehydrated polyoxypropylene glycol (hydroxyl value=110.0) and 174 parts of an 80/20 mixture of 2,4-tolylene diisocyanate/2.6-tolylene diisocyanate, and the mixture was reacted at 90° C. for 2.5 hours to obtain a urethane prepolymer having a free isocyanate group content of 5.87%.

Separately, another flask was charged with 61.8 parts of diethylene triamine dissolved in the same amount of methylethyl ketone, and 55.5 parts of epichlorohydrin dissolved in the same amount of methylethyl ketone was added dropwise over a period of about 30 minutes at 30° to 45° C. from a dropping funnel. Reaction was carried out at 45° C. for 1.5 hours under agitation. The resulting reaction mixture solution having a concentration of 50% did not contain an epoxide group but contained covalently bonded chlorine atoms.

Then, 17.7 parts of the thus-prepared solution was mixed with 3.9 parts of piperazine, and the mixture was diluted with 400 parts of methylethyl ketone. Then, 110 parts of the above urethane prepolymer diluted with 102 parts of methylethyl ketone was added dropwise to the above dilution at 30° to 31° C. over a period of 10 minutes. Then, reaction was carried out at 50° C. for 30 minutes.

Then, 3.4 parts of acetic acid and 485 parts of water were added to 610 parts of the thus-prepared polymer solution, and methylethyl ketone was removed by distillation at 40° to 45° C. under reduced pressure to obtain an emulsion having a resin content of 22%.

A heat-treated film prepared from this emulsion in the same manner as described in Example 4 had the following mechanical properties:
 100% Modulus: 9 Kg/cm²
 300% Modulus: 16 Kg/cm²
 Tensile strength: 168 Kg/cm²
 Elongation: 570%

Separately, 5.5 parts of glycerin polyglycidyl ether was added to 100 parts of the above emulsion and homogeneously mixed therewith, and a heat-treated film having the following mechanical properties was prepared from the resulting composition in the same manner as described in Example 4:
 100% Modulus: 21 Kg/cm²
 300% Modulus: 46 Kg/cm²
 Tensile strength: 271 Kg/cm²
 Elongation: 460%

EXAMPLE 8

(A) A round-bottom flask was charged with 147.9 parts of an 80/20 mixture of 2,4-tolylene diisocyanate/2,6-tolylene diisocyanate, and a solution of 96.05 parts of ε-caprolactam in 453 parts of methylethyl ketone was added thereto. Reaction was carried out at 70° C. for 1 hour to obtain a methylethyl ketone solution of a blocked isocyanate compound having one free isocyanate group. The free isocyanate group content of this solution was 5.16%.

(B) In 204.8 parts of benzene was dissolved 275.5 parts of polyoxypropylene glycol (hydroxyl value=162.9) dehydrated at 100° C. for 2 hours under reduced pressure, and 200 parts of diphenylmethane-4,4'-diisocyanate was added to the solution and reaction was carried out at 75° C. for 3.5 hours to obtain a urethane prepolymer solution having a free isocyanate group content of 4.90%. In another flask, 20 parts of triethylene tetramine was added to 400 parts of methylethyl ketone and homogeneously mixed therewith. Then, 200 parts of the above urethane prepolymer solution was added dropwise to the above mixture over a period of about 35 minutes and reaction was carried out at 50° C. for 40 minutes to obtain a polyurethane urea polyamine solution.

Then, 130 parts of the methylethyl ketone solution of the blocked isocyanate compound obtained in (A) above was added to the so prepared polyurethane urea polyamine solution, and reaction was carried out at 50° C. for 30 minutes. Then, 16.5 parts of 35% hydrochloric acid and 650 parts of water were added to the reaction mixture, and the organic solvent was removed by distillation under reduced pressure at 50° C. to obtain a homogeneous stable emulsion having a resin content of 25%.

A heat-treated film having the following mechanical properties was prepared from the above emulsion in the same manner as described in Example 4:

100% Modulus: 16 Kg/cm$^2$
Tensile strength: 139 Kg/cm$^2$
Elongation: 770%

Separately, 6.3 parts of trimethylol propane polyglycidyl ether was added to 100 parts of the above emulsion and homogeneously mixed therewith, and a heat-treated film having the following mechanical properties was prepared in the same manner as described in Example 4.

100% Modulus: 28 Kg/cm$^2$
Tensile strength: 243 Kg/cm$^2$
Elongation: 620%

The embodiments of the invention in which an exclusive property or privilege is claimed are defined as follows:

1. A curable cationic polyurethane emulsion capable of forming a film possessing excellent physical properties, which comprises a mixture of a cationic polyurethane resin aqueous emulsion and from 2 to 50 parts by weight, per 100 parts by weight of the polyurethane resin, of an epoxide group-containing compound selected from the group consisting of diglycidyl ethers of diol selected from ethylene glycol, propylene glycol, polyoxyethylene glycol, polyoxypropylene gycol, neopentyl glycol and bisphenol A, polyglycidyl ethers of polyol selected from glycerin, trimethylol propane, pentaerythritol, diglycerol and sorbitol, and allyl glycidyl ether and oligomers thereof, said cationic polyurethane resin emulsion having been prepared by either (1) reacting an isocyanate-terminated urethane prepolymer (A) with an excess amount of a polyalkylene polyamine to form a polyurethane urea polyamine (B), and either
   (a) mixing said polyurethane urea polyamine (B) with an aqueous solution of an acid,
   (b) reacting said polyurethane urea polyamine (B) with an epihalohyrin and mixing the resulting reaction product with an aqueous solution of an acid, or
   (c) partially reacting free amino groups of said polyurethane urea polyamine (B) with a blocked polyisocyanate having one free isocyanate group, which blocked polyisocyanate has been obtained by reacting a polyisocyanate with an isocyanate-blocking agent, and mixing the resulting reaction with an aqueous solution of an acid, or (2) reacting said urethane prepolymer (A) with a polyalkylene polyamine derivative having at least two primary or secondary amino groups and at least one functional group having the formula —CH$_2$—CH(OH)—CH$_2$X, in which X is Cl, or BR, and mixing the resulting reaction product with an aqueous solution of an acid.

2. A cationic polyurethane emulsion composition as set forth in claim 1 wherein the polyalkylene polyamine is one having at least two primary or secondary amino groups.

3. A cationic polyurethane emulsion composition as set forth in claim 1 wherein the polyalkylene polyamine is diethylene triamine or triethylene tetramine.

4. A cationic polyurethane emulsion composition as set forth in claim 1 wherein the epihalohydrin is epichlorohydrin or epibromohydrin.

5. A cationic polyurethane emulsion composition as set forth in claim 1 wherein the blocking agent is ε-caprolactam or methylethyl ketone oxime.

6. A cationic polyurethane emulsion composition as set forth in claim 1 wherein the epoxide group-containing compound is a polyglycidyl ether obtained from epichlorohydrin and at least one member selected from the group consisting of ethylene glycol, polyoxyethylene glycol, trimethylol propane, diglycerol, sorbitol, propylene glycol and glycerine.

7. An emulsion according to claim 1 in which said epoxide group-containing compound is glycerin polyglycidyl ether.

8. A curable cationic polyurethane emulsion as claimed in claim 1, in which said polyurethane urea polyamine has been prepared by reacting, in the liquid phase and in a ketone solvent at a temperature from −20° to +70° C. (A) isocyanate-terminated urethane prepolymer prepared by reacting organic polyol having a molecular weight in the range of from 200 to 10,000 with an excess of organic polyisocyanate, with (B) an excess of polyalkylene polyamine having at least two primary or secondary amino groups or polyalkylene polyamine having at least two primary or secondary amino groups and also having a functional group of the formula —CH$_2$—CH(OH)—CH$_2$X, wherein X is chloro or bromo, the total mole number of primary and secondary amino groups in the polyalkylene polyamines being greater than the total mole number of isocyanate groups in the isocyanate-terminated urethane prepolymer, the reaction being carried out until the presence of —NCO groups cannot be detected, whereby to form polyurethane-urea-polyamine having a molecular weight of 5,000 to 100,000.

9. An emulsion according to claim 8, in which the reactant (B) includes up to 50 percent, by molecular equivalent, of diamines or alkylene oxide adducts, acrylonitrile adducts or acrylate adducts of diamines.

10. An emulsion according to claim 8, in which the ratio of (b) the total mole number of amino groups containing active hydrogen atoms in the polyalkylene polyamine, to (a) the total mole number of isocyanate groups in said urethane prepolymer is in the range of $1 < (b/a) \leq 3$.

11. An emulsion according to claim 8, in which the polyalkylene polyamine has the formula

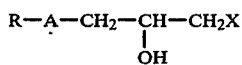

wherein X is Cl or Br, A is a secondary or tertiary amino group and R is alkylene having at least one primary or secondary amino group, provided that the sum of the primary and secondary amino groups in the polyalkylene polyamine is at least two.

12. An emulsion according to claim 8, in which said polyalkylene polyamine has the formula

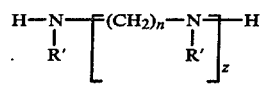

wherein n is an integer larger than one, z is an integer from 2 to 4 and R' is hydrogen, alkyl having one to four carbon atoms or hydroxyalkyl having one to four carbon atoms.

13. An emulsion according to claim 8, in which said acid is selected from the group consisting of hyrochloric acid, nitric acid, acetic acid, propionic acid, monochloroacetic acid and glycolic acid.

14. An emulsion according to claim 8, in which said acid is glycolic acid.

15. An emulsion according to claim 8 in which said epoxide group-containing compound is selected from the group consisting of ethylene glycol diglycidyl ether, propylene glycol diglycidyl ether, polyoxyethylene glycol diglycidyl ether, polyoxypropylene glycol diglycidyl ether, neopentyl glycol diglycidyl ether, bisphenol A diglycidyl ether, glycerine polyglycidyl ether, trimethylol propane polyglycidyl ether, pentaerythritol polyglycidyl ether, diglycerol polyglycidyl ether, sorbitol polyglycidyl ether, allyl glycidyl ethers and oligomers thereof.

* * * * *